(12) United States Patent
Slagerman (10) Patent No.: US 8,662,516 B1
(45) Date of Patent: Mar. 4, 2014

(54) WHEELCHAIR CASTER MOUNTING ASSEMBLY

(71) Applicant: Murray G. Slagerman, Rosser (CA)

(72) Inventor: Murray G. Slagerman, Rosser (CA)

( * ) Notice: Subject to any disclaimer, the term of this patent is extended or adjusted under 35 U.S.C. 154(b) by 0 days.

(21) Appl. No.: 13/783,510

(22) Filed: Mar. 4, 2013

Related U.S. Application Data

(60) Provisional application No. 61/606,804, filed on Mar. 5, 2012.

(51) Int. Cl.
*B62M 1/14* (2006.01)

(52) U.S. Cl.
USPC .................................. 280/250.1; 280/86.751

(58) Field of Classification Search
USPC ............. 280/86.751, 43, 250.1, 43.13; 16/19, 16/31, 45
See application file for complete search history.

(56) References Cited

U.S. PATENT DOCUMENTS

| 6,182,982 | B1 * | 2/2001 | Fleigle ............................. 280/43 |
| 7,231,689 | B2 * | 6/2007 | Scheiber et al. .................. 16/19 |

| 2006/0087098 | A1 | 4/2006 | Peterson |
| 2011/0221161 | A1 | 9/2011 | Ludovici et al. |
| 2011/0221162 | A1 | 9/2011 | Ludovici et al. |
| 2011/0291387 | A1 | 12/2011 | Chang Liao |

FOREIGN PATENT DOCUMENTS

JP   2003180758   7/2003

* cited by examiner

*Primary Examiner* — Tashiana Adams
(74) *Attorney, Agent, or Firm* — Ryan W. Dupuis; Kyle R. Satterthwaite; Ade & Company, Inc.

(57) ABSTRACT

A caster mounting assembly for mounting a caster wheel on a wheelchair frame includes a mounting body defining a barrel portion to be fixed relative to the wheelchair frame and a rotatable body within the barrel portion that supports the caster wheel thereon for rotation relative to the rotatable body about an upright caster axis. The caster axis is arranged for rotation together with the rotatable body relative to the mounting body. A locking member is slidable within a channel in the mounting body and includes teeth in meshing engagement with corresponding teeth on the rotatable body. One or more positioning screws permit the locking member to be controllably displaced between longitudinally different locking positions within the channel corresponding to different angular orientations of the caster wheel axis.

20 Claims, 8 Drawing Sheets

WHEELCHAIR CASTER MOUNTING ASSEMBLY

This application claims the benefit under 35 U.S.C. 119(e) of U.S. provisional application Ser. No. 61/606,804, filed Mar. 5, 2012.

FIELD OF THE INVENTION

The present invention relates to a caster mounting assembly for mounting a front caster wheel on a forward frame member of a wheelchair frame, and more particularly the present invention relates to a caster mounting assembly for mounting a caster wheel on a frame such that an upright swivel axis of the caster wheel is adjustable through a range of angular orientations relative to the frame.

BACKGROUND

As described in US Patent Application Publication No. 2011/0221161 by Ludovici et al, a typical wheelchair includes a seat supported by a frame resting upon four wheels. A front wheel and a rear wheel are disposed on each side of the wheelchair. The pair of rear wheels may be located under or behind a seat upon which the occupant of the wheelchair is seated. The front wheels are located in front of the rear wheels and pivot to facilitate steering. Generally, the rear wheels are mounted to opposite sides of the frame by an axle assembly. Generally, the front wheels are mounted to opposite sides of the frame by a bearing fork assembly.

In many wheelchair designs, the front wheels have a significantly smaller radius than the rear wheels. Therefore, the axles of the rear wheels are typically mounted to the frame at locations that are elevated from the locations of attachment of the axles of the front wheels to the frame. In this manner, an angle of the frame relative to the ground may be determined by the locations in which the front and rear wheels are mounted to the frame and the diameter of the front and rear wheels, or by the manufacturer of the custom wheelchair frame.

An angle is defined between the frame and the ground. For front and rear wheels each having a predetermined and substantially constant diameter, the angle may be determined by the attachment location of the front wheels relative to the attachment location of the rear wheels. Because it may be desirable to adjust the seat angle relative to the ground in some wheelchair designs, the vertical and/or horizontal positions of the rear and/or front wheels relative to the frame may be adjusted.

Each of the front wheels is mounted to the longitudinal frame member by a bearing fork assembly. In many wheelchair designs, the bearing fork assembly includes a bearing fork and an upright pivot pin, which may be implemented as a stem bolt. The bearing fork is coupled to an axle about which the front wheel rotates. The upright pivot pin pivotally couples the bearing fork to the frame. To steer the wheelchair, the bearing fork pivots about the upright pivot pin.

As a general rule, it is desirable to orient the upright pivot pin generally perpendicular to the ground. If the upright pivot pin is not perpendicular to the ground, the front wheels may not pivot properly. Further, because the front wheels typically pivot to facilitate steering the wheelchair, if the upright pivot pin is not perpendicular to the ground, the front wheel may not rotate properly and the steering of the wheelchair may be impaired.

A wheelchair may require adjustment to fit a particular user. For example, many wheelchairs allow the user to adjust the height of the seat by vertically moving the location where the frame attaches to the rear axles. This adjustment will typically modify the angle of the seat relative to the ground. Similarly, some wheelchair designs allow a user to move the rear wheels longitudinally forward and backward relative to the seat, which may also modify the angle of the seat.

The ability to change the angle of the seat is important to proper positioning of the wheelchair occupant. Increasing the angle of the seat (i.e., increasing the height of the front of the seat relative to the back of the seat) allows gravity to help prevent the occupant of the wheelchair, who will likely have limited or no lower extremity function and perhaps limited trunk muscular control, from sliding out of the seat.

Often, finding the correct angle of the seat is a matter of trial and error. Over time, the most desirable angle may change. For example, a particular wheelchair user may have a degenerative disease that requires increasing the angle over time. Alternatively, as people age they become more susceptible to pressure sores. By reducing the angle of the seat, it is possible to reduce the pressure on the buttocks.

If the angle of the frame relative to the ground is changed, the angle of the upright pivot pins of the bearing fork assemblies may require adjustment to reorient the upright pivot pins perpendicular to the ground. Therefore, a need exists for devices that rotate the upright pivot pins to which the bearing forks are mounted to position the upright pivot pins perpendicular to the ground.

Although various devices exist in the prior art which provide some angular adjustment of the upright pivot pins, most prior art configuration either: i) are limited to a few preselected orientations; ii) are limited in overall range of adjustment permitted; iii) require considerable disassembly and reassembly to adjust; or iv) a combination of the above.

SUMMARY OF THE INVENTION

According to one aspect of the invention there is provided a caster mounting assembly for mounting a caster wheel on a frame, the assembly comprising:

a mounting body including a mounting portion arranged to be fixed onto the frame;

a rotatable body supported on the mounting body for rotation relative to the mounting body;

a bearing support member arranged to support the caster wheel thereon for steering movement about a caster axis defined by the bearing support member, the bearing support member being coupled to the rotatable body for rotation therewith relative to the mounting body about the central axis of the rotatable body between a plurality of angular positions corresponding to different angular orientations of the caster axis relative to the mounting body;

a positioning screw arranged to be supported on the mounting body for rotation about a longitudinal axis of the positioning screw relative to the mounting body between a plurality of locking positions; and a control assembly operatively connected between the positioning screw and the rotatable body such that the bearing support member is movable between the plurality of angular positions responsive to rotation of the positioning screw about the longitudinal axis between the plurality of locking positions.

Preferably the positioning screw is arranged to be fixed relative to the mounting body at any one of the plurality of locking positions whereby the bearing support member is retained at a corresponding angular position.

According to a second aspect of the present invention there is provided a caster mounting assembly for mounting a caster wheel on a frame, the assembly comprising:

a mounting body including a mounting portion arranged to be fixed onto the frame and a barrel portion defining a generally cylindrical inner surface portion;

a rotatable body having a generally cylindrical outer surface portion received within the generally cylindrical inner surface portion of the barrel portion so as to be supported for rotation relative to the mounting body about a central axis of the rotatable body and a toothed portion including teeth which are spaced apart from one another in a circumferential direction relative to the central axis of the rotatable body;

a bearing support member arranged to support the caster wheel thereon for steering movement about a caster axis defined by the bearing support member, the bearing support member being coupled to the rotatable body for rotation therewith relative to the mounting body about the central axis of the rotatable body between a plurality of angular positions corresponding to different angular orientations of the caster axis relative to the mounting body; and a locking member supported on the mounting body so as to be movable between a plurality of locking positions;

the locking member including a mating portion formed thereon which is interlocked with the teeth on the rotatable body such that the rotatable body is pivotal between the different angular positions together with movement of the locking member between the plurality of locking positions; and the locking member being arranged to be fixed relative to the mounting body at any one of the plurality of locking positions.

The configuration of the rotatable body having a circumferential toothed portion with a mating locking member ensures that the angular orientation of the caster axis can be adjusted through an infinite number of positions within any selected overall range of adjustment desired. Furthermore, the locking member can be arranged for fine adjustment of the angular orientation without any disassembly and reassembly being required. Accordingly the angular orientation of the caster axis can be adjusted with the wheelchair remaining in its normal operating position, even with a user supported therein.

According to another aspect of the present invention there is provided a caster wheel assembly for being supported on a forward frame member of a wheelchair frame, the caster wheel assembly comprising:

a connecting strut extending between a first end arranged to be coupled to the forward frame member of the wheelchair frame and a second end opposite the first end;

a mounting body including a mounting portion fixed onto the second end of the connecting strut and a barrel portion defining a generally cylindrical inner surface portion;

a rotatable body having a generally cylindrical outer surface portion received within the generally cylindrical inner surface portion of the barrel portion so as to be supported for rotation relative to the mounting body about a central axis of the rotatable body and a toothed portion including teeth which are spaced apart from one another in a circumferential direction relative to the central axis of the rotatable body;

a caster wheel;

a bearing support member supporting the caster wheel thereon for steering movement about a caster axis defined by the bearing support member, the bearing support member being coupled to the rotatable body for rotation therewith relative to the mounting body about the central axis of the rotatable body between a plurality of angular positions corresponding to different angular orientations of the caster axis relative to the mounting body; and a locking member supported on the mounting body so as to be movable between a plurality of locking positions;

the locking member including a mating portion formed thereon which is interlocked with the teeth on the rotatable body such that the rotatable body is pivotal between the different angular positions together with movement of the locking member between the plurality of locking positions; and the locking member being arranged to be fixed relative to the mounting body at any one of the plurality of locking positions.

According to a further aspect of the present invention there is provided a wheelchair comprising:

a frame including a seat portion comprising two side frame members extending in a forward direction from a rear end to a front end, a forward leg portion comprising two forward frame members extending downwardly and forwardly from the front end of respective ones of the side frame members, and an upper portion extending upwardly from a rear end of the side frame members;

two rear wheel assemblies supporting the rear end of the seat portion on a pair of rear wheels; and two front caster wheel assemblies supported on the two forward frame member respectively, each caster wheel assembly comprising:

a connecting strut extending between a first end coupled to the respective forward frame member and a second end opposite the first end;

a mounting body including a mounting portion fixed onto the second end of the connecting strut and a barrel portion defining a generally cylindrical inner surface portion;

a rotatable body having a generally cylindrical outer surface portion received within the generally cylindrical inner surface portion of the barrel portion so as to be supported for rotation relative to the mounting body about a central axis of the rotatable body and a toothed portion including teeth which are spaced apart from one another in a circumferential direction relative to the central axis of the rotatable body;

a front caster wheel;

a bearing support member supporting the caster wheel thereon for steering movement about a caster axis defined by the bearing support member, the bearing support member being coupled to the rotatable body for rotation therewith relative to the mounting body about the central axis of the rotatable body between a plurality of angular positions corresponding to different angular orientations of the caster axis relative to the mounting body; and a locking member supported on the mounting body so as to be movable between a plurality of locking positions;

the locking member including a mating portion formed thereon which is interlocked with the teeth on the rotatable body such that the rotatable body is pivotal between the different angular positions together with movement of the locking member between the plurality of locking positions; and the locking member being arranged to be fixed relative to the mounting body at any one of the plurality of locking positions.

In the illustrated embodiment, the generally cylindrical outer surface portion of the rotatable body and the generally cylindrical inner surface portion of the mounting body preferably each extend in the circumferential direction more than 180 degrees, while the toothed portion extends in the circumferential direction through a range less than 180 degrees.

The teeth may have an outer radius relative to the central axis which is substantially identical to the generally cylindrical outer surface portion.

Preferably the teeth have a straight cut profile arranged for meshing with a corresponding profile formed on the mating portion of the locking member.

The barrel portion of the mounting body may be slotted such that the generally cylindrical inner surface portion is generally C-shaped between two opposing ends which are spaced apart from one another. In this instance preferably there is provided a clamping assembly arranged to be connected between the opposing ends such that the mounting body is arranged to provide circumferential clamping about the rotatable body received therein. Preferably the clamping assembly includes a clamping screw arranged to commonly fix the locking member relative to the housing at a selected one of the locking positions and provide circumferential clamping about the rotatable body when tightened.

The locking member is preferably supported on the mounting body for linear sliding movement along a sliding axis between the plurality of locking positions in which the mating portion comprises teeth which are linearly spaced apart so as to be arranged for meshing engagement with the teeth of the rotatable body. In this instance the mounting body preferably includes a channel formed integrally therein having a cross section which mates with a cross section of the locking member so as to support the locking member for linear sliding movement therein.

Preferably at least one positioning screw is provided including a first portion engaging the mounting body in abutment therewith and a second portion in threaded connection with the locking member. The second portion preferably has a longitudinal axis extending in a direction of the sliding axis such that rotation of said at least one positioning screw about the longitudinal axis positions the locking member along the sliding axis relative to the mounting body.

Preferably the positioning screws comprise a pair of axially opposed positioning screws having first portions arranged to be clamped against opposing sides of the mounting body and second portions in threaded connection with opposing ends of the locking member.

When the barrel portion of the mounting body is slotted such that the generally cylindrical inner surface portion is generally C-shaped between two opposing ends which are spaced apart from one another, preferably the first portions of the positioning screws are arranged to be clamped in proximity to respective ones of the opposing ends of the inner surface portion such that the positioning screws are arranged to provide circumferential clamping about the rotatable body received therein in addition to positioning the locking member relative to the mounting body at one of the plurality of locking positions.

The mounting portion of the mounting body may comprise a lug arranged to be matingly received within an open end of a tubular frame member of a wheelchair.

The caster mounting assembly may be provided in combination with a caster wheel assembly in which the bearing support member comprises a shaft and the caster wheel assembly comprises: i) annular bearing members supported on the shaft; ii) a sleeve portion supported about the annular bearing members so as to be supported for rotation relative to the shaft; and iii) a caster wheel supported on the sleeve portion for rotation about a horizontal rolling axis such that the caster wheel and horizontal rolling axis thereof are rotatable with the sleeve portion relative to the shaft.

Alternatively, the caster mounting assembly may be provided in combination with a caster wheel assembly in which the bearing support member comprises a sleeve portion and the caster wheel assembly comprises: i) annular bearing members supported within the sleeve portion; ii) a shaft extending through the annular bearing members so as to be supported for rotation relative to the sleeve portion; and iii) a caster wheel supported on the shaft for rotation about a horizontal rolling axis such that the caster wheel and horizontal rolling axis thereof are rotatable with the shaft relative to the sleeve portion.

In an alternatively embodiment, the locking member may comprise a positioning screw rotatably supported on the mounting body such that the mating portion comprises threads on the positioning screw in meshing engagement with the teeth on the rotatable body.

The caster mounting assembly is preferably supported on a forward frame member of a wheelchair frame in which the assembly further comprises a connecting strut extending between a first end arranged to be coupled to the forward frame member of the wheelchair frame and a second end opposite the first end supporting the mounting body thereon.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying figures, there is illustrated a wheelchair caster mounting assembly generally indicated by reference numeral 10. The assembly 10 is particularly suited for use with a wheelchair frame 12.

Figure 1:
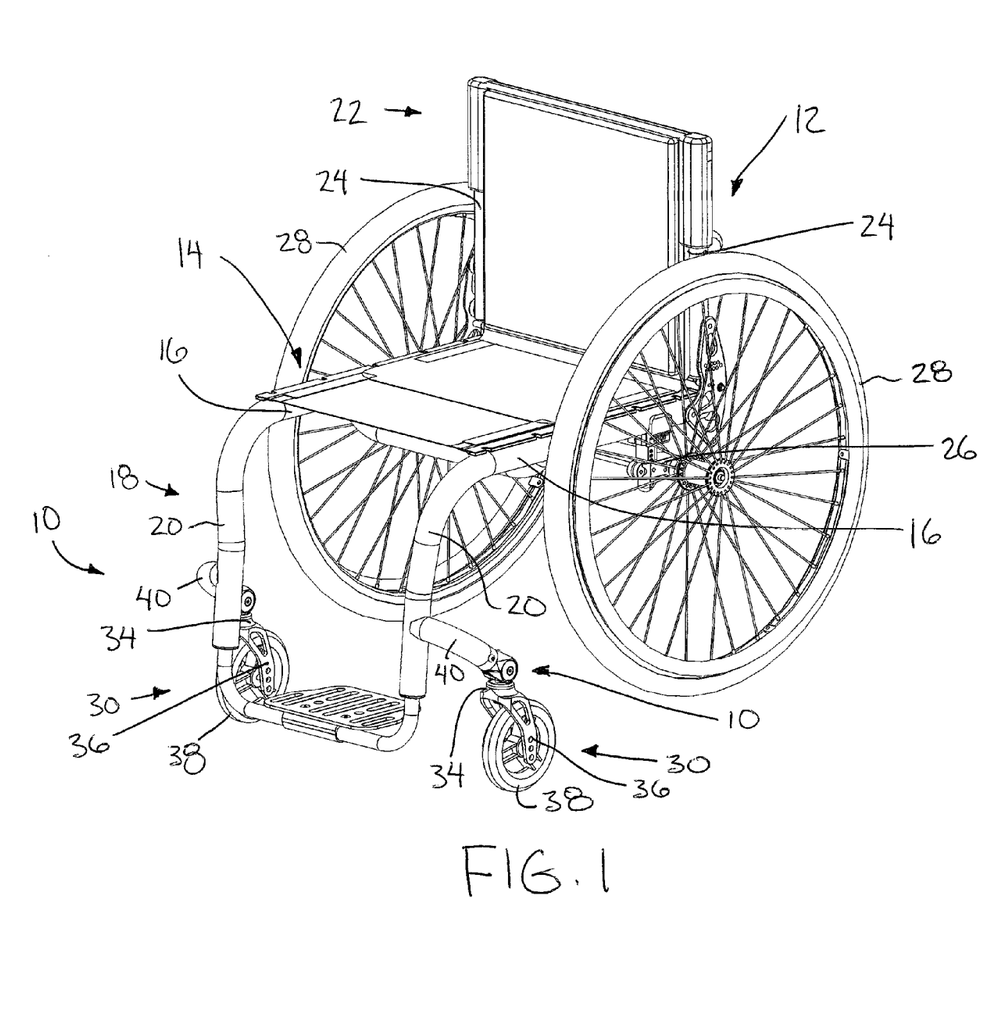
FIG. 1 is a perspective view of a wheelchair in which two of the caster mounting assemblies support respective front caster wheels on a frame of the wheelchair.

Typically the wheelchair frame 12 comprises a seat portion 14 comprising two side frame members 16 extending in a forward direction from rear ends to front ends along opposing sides of the frame. A leg portion 18 of the frame typically comprises two front frame members 20 extending generally downwardly from the front ends of respective ones of the two side frame members 16. An upper portion 22 of the frame typically includes two upper frame members 24 extending upwardly from respective rear ends of the two side frame members 16. In this manner, a seating surface can be supported to span between the two side frame members while a backrest of the seating surface can be supported to span between the two upper frame members 24.

To support the wheelchair frame for rolling movement on the ground, two rear wheel assemblies 26 are typically provided for mounting respective rear wheels 28 below the rear ends of the two side frame members 16 to support the rear end of the frame for rolling movement on the ground. Furthermore, two front caster assemblies 30 are supported on the two front frame members 20 to support the front end of the frame for rolling movement on the ground.

Each front caster assembly is supported on the respective front frame member 20 by a respective one of the wheelchair caster mounting assemblies 10. The front caster assemblies 30 are mirror images of one another.

Each front caster assembly 30 in the illustrated embodiment is arranged for mounting on a suitable caster shaft 32 of the mounting assembly 10. The caster assembly includes a sleeve portion 34 which is coupled for rotation relative to the caster shaft by annular bearings supported about the shaft and received within the sleeve portion. The annular bearings couple the sleeve portion 34 for rotation relative to the shaft 32 about an upright caster axis defined by the longitudinal axis of the shaft. The sleeve portion 34 includes an integral fork 36 which supports a front caster wheel 38 rotatably thereon at a location below the sleeve portion 34 such that the wheel is rotatable about a horizontal rolling axis defined by the fork. The wheel 34, the sleeve portion, and the rolling axis of the wheel are all rotatable together about the caster axis relative to the shaft 32.

Figure 2:
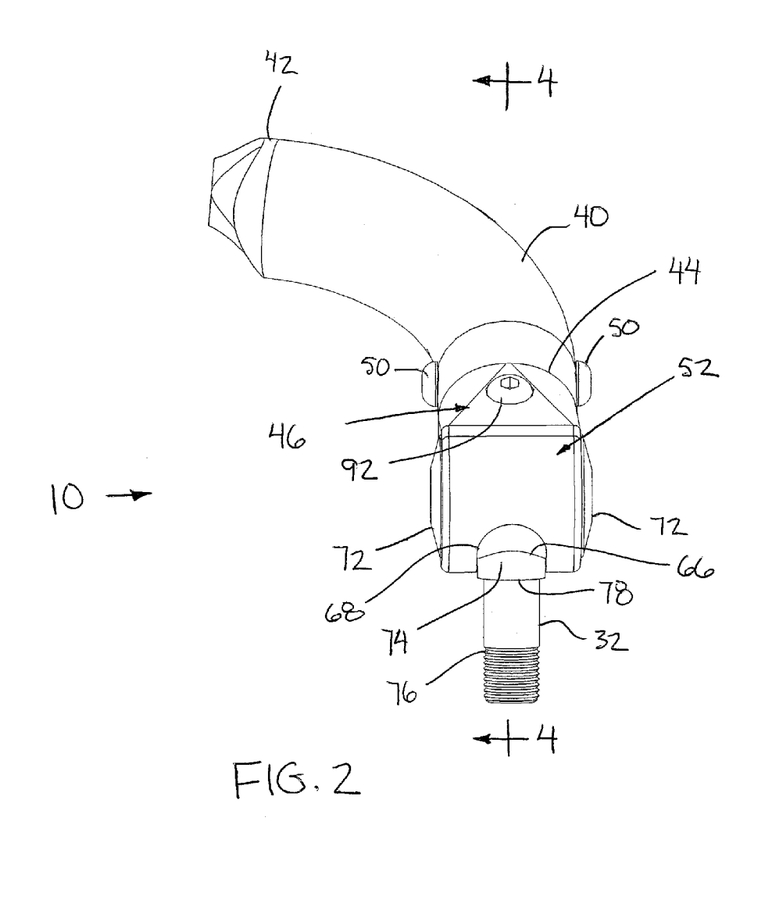
FIG. 2 is a rear elevational view of the caster mounting assembly for mounting on the right side of the wheelchair frame.
Figure 3:
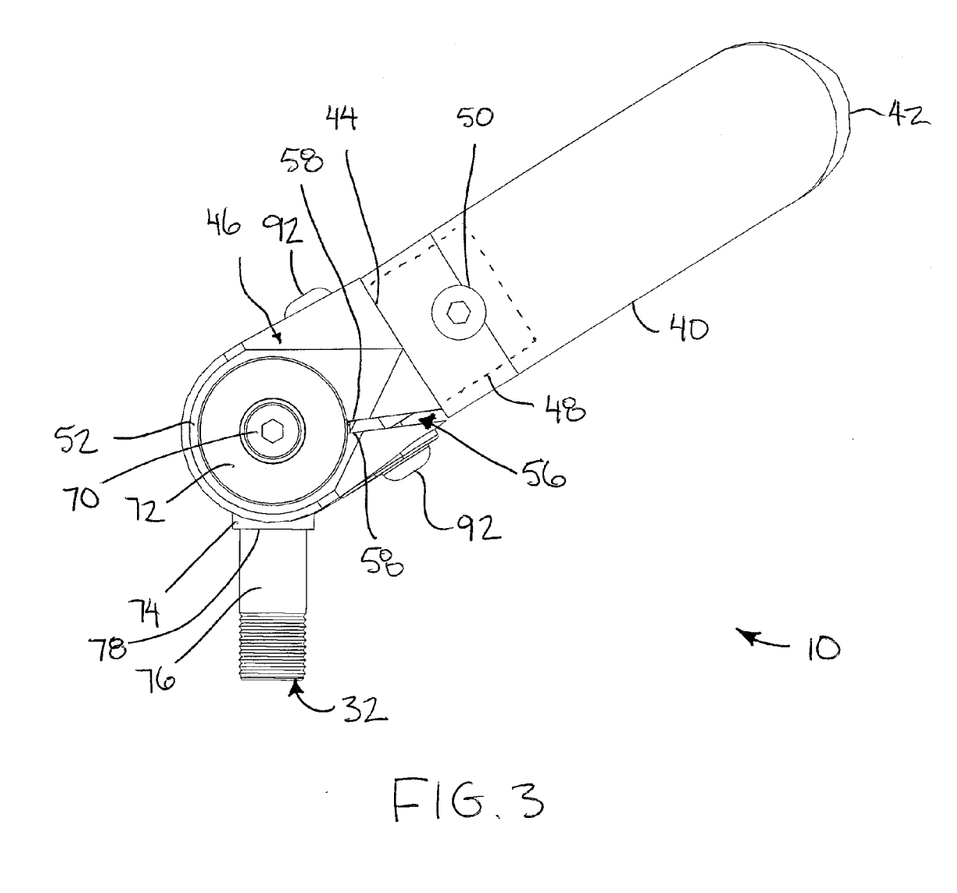
FIG. 3 is an outer side elevational view of the caster mounting assembly according to FIG. 2.

Each mounting assembly 10 includes a connecting strut 40 in the form of hollow tubular frame member extending between a first end 42 which is shaped for a mating welded connection to a cylindrical surface portion of the respective front frame member 20 and an opposing second end 44. The first end is typically oriented to extend substantially laterally outwardly from the respective front frame member. A bend is provided in the intermediate portion of the connecting strut such that the opposing second end 44 is typically inclined downwardly and rearwardly.

The assembly 10 includes a mounting body 46 supported on the second end 44 of the strut which supports the caster shaft 32 thereon such that the angular orientation of the caster shaft is adjustable relative to the mounting body and the connecting strut upon which it is supported.

Figure 4:
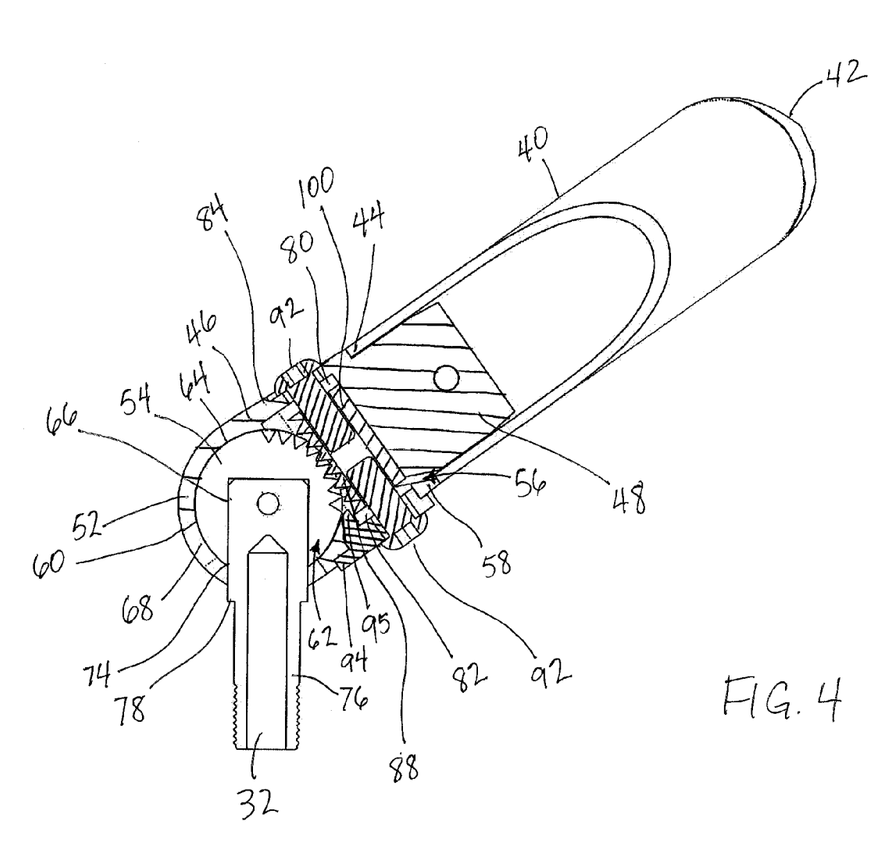
FIG. 4 is a sectional view along the line 4-4 of FIG. 2.
Figure 5:
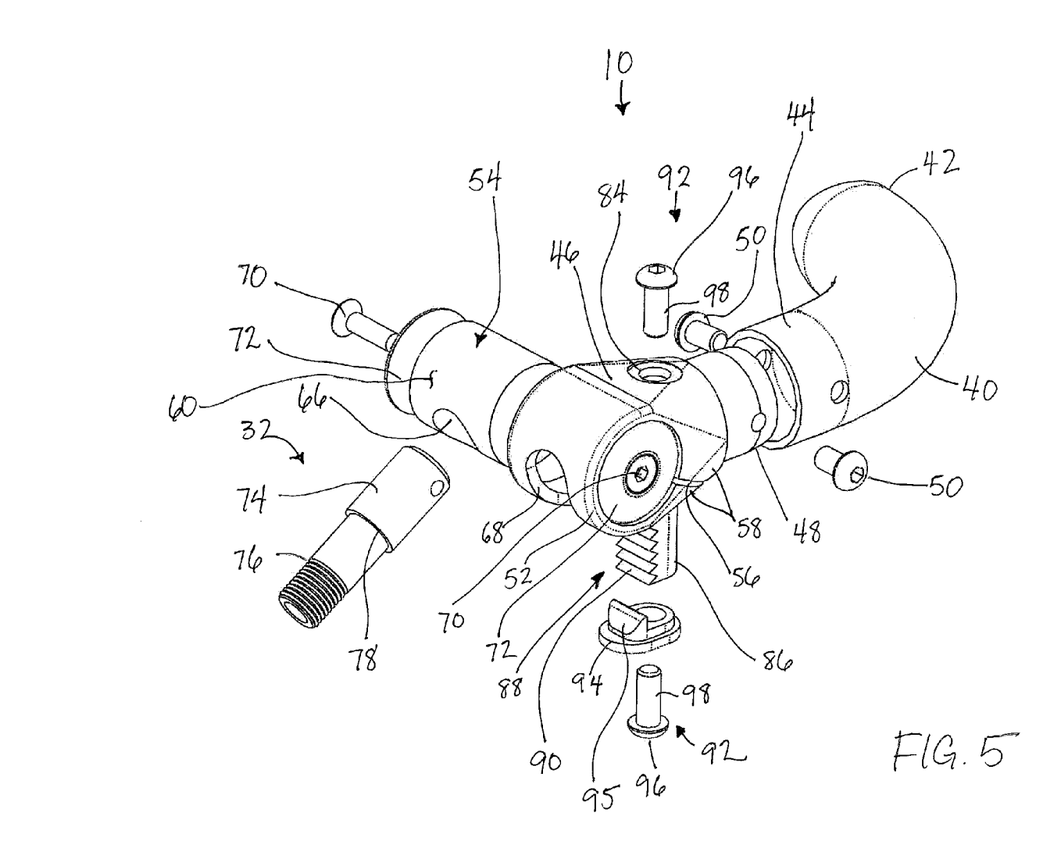
FIG. 5 is an exploded perspective view of the caster mounting assembly according to FIG. 2 showing a top side and an outer side of the caster mounting assembly.
Figure 6:
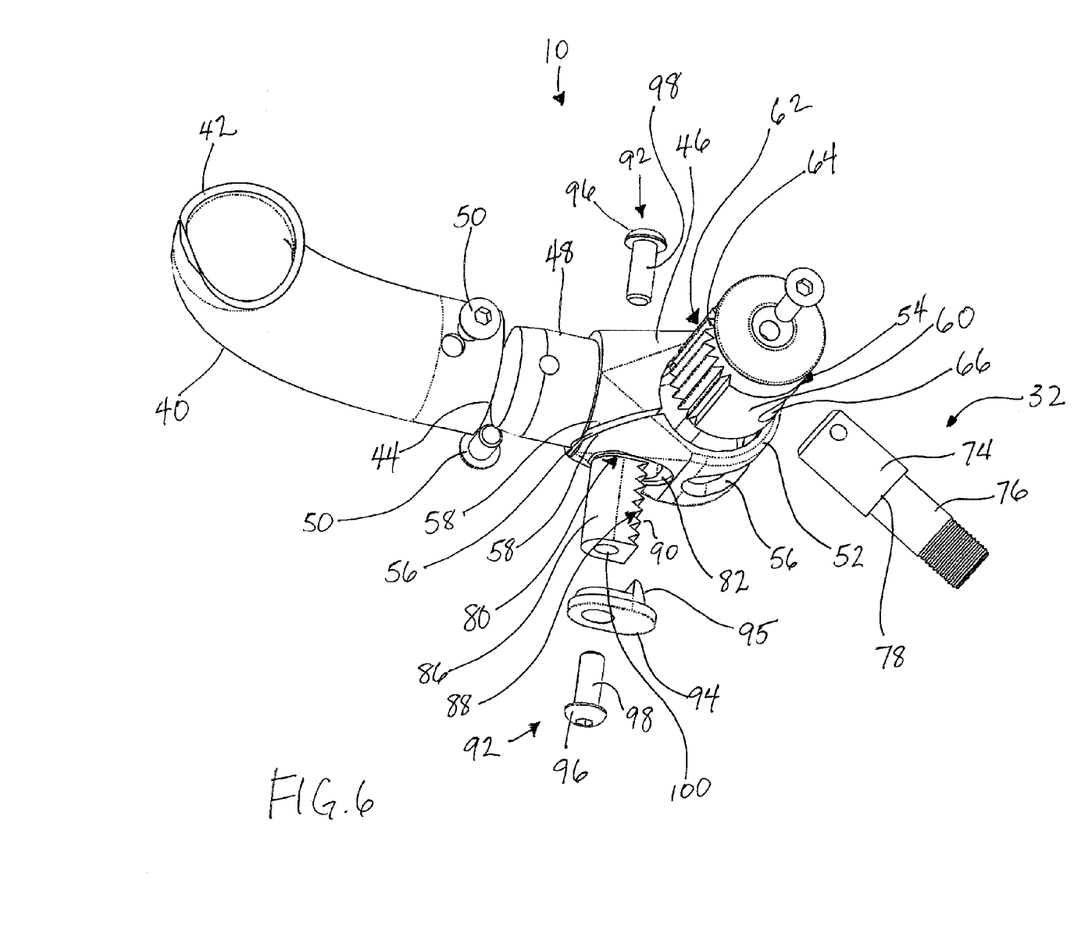
FIG. 6 is an exploded perspective view of the caster mounting assembly according to FIG. 2 showing a bottom side and an inner side of the caster mounting assembly.

The mounting body includes a mounting portion 48 in the form of a substantially cylindrical lug arranged to be received within the open end at the second end of the tubular connecting strut for being retained therein in a mounted position. The outer diameter of the lug and the inner diameter of the open end of the tube are typically arranged for either i) an interference fit such that the mounting body is press fit and frictionally retained within the end of the tube or ii) a clearance fit in which the mounting body is fixed within the end of the tube with a structural adhesive. A pair of retaining screws 50 are fastened radially through the wall of the tube adjacent the second end 44 at diametrically opposed locations for threaded connection into corresponding locations on the mounting portion 48 of the body to additionally retain the mounting body in a fixed mounted position relative to the connecting strut.

The mounting body further includes a barrel portion 52 defining a generally cylindrical socket extending through the mounting body in a generally lateral direction substantially perpendicular to a forward rolling direction of the wheelchair between two opposing open ends. The barrel portion 52 defines a generally cylindrical inner surface receiving a generally cylindrical rotatable body 54 therein such that the rotatable body is supported for rotation about a central axis thereof relative to the mounting body.

A slot 56 is formed in the mounting body to extend from the generally cylindrical inner surface of the barrel portion to an external surface along a full width of the barrel portion between the axially opposed open ends such that the resulting inner surface of the barrel portion is substantially C-shaped between two circumferentially opposing ends 58. The slot 56 is located in proximity to the mounting portion 48 at an intermediate portion of the mounting body between the mounting portion and the barrel portion.

The rotatable body 54 includes a generally cylindrical outer surface portion 60 having an outer diameter which closely fits within the inner diameter of the inner surface portion of the barrel portion. The cylindrical surface portion 60 extends in the circumferential direction more than 180 degrees about the central axis of the body such that a substantial portion of the rotatable body is in sliding engagement with the cylindrical inner surface portion of the barrel portion of the mounting body as the rotating body is rotated relative to the mounting body.

The rotatable body also includes a toothed portion 62 defining a plurality of teeth 64 which are spaced apart with one another in sequence in the circumferential direction about the central axis of the rotatable body. Each tooth is defined by an adjacent pair of axially extending grooves formed into the cylindrical outer surface portion 60 of the body such that a radial dimension of the outer ends of the teeth relative to the central axis is substantially identical to the radial dimension of the cylindrical surface portion 60 of the rotatable body to provide smooth rotatable engagement with the cylindrical inner surface portion of the barrel portion of the mounting body.

The teeth comprise straight cut teeth spanning the full axial width of the rotatable body, with the rotatable body spanning the full axial width of the barrel portion of the mounting body. The sequence of teeth of the toothed portion spans less than 180 degrees in the circumferential direction about the central axis. For example, in the illustrated embodiment, the toothed portion spans in the circumferential direction near 120 degrees while the remaining portion of the circumference is occupied by the cylindrical outer surface portion 60 of the body.

The rotatable body 54 is inserted into the barrel portion by sliding in the axial direction through one of the open ends of the barrel portion. Once inserted, a bearing support member defined by the caster shaft 32 can be coupled to the rotatable body for pivotal movement therewith relative to the mounting body. For mounting the shaft, a radial bore 66 is formed at an axially centered location to extend radially outward at an intermediate location in the circumferential direction of the cylindrical outer surface portion 60.

The bore 66 aligns with a corresponding slot 68 extending through the wall of the barrel portion at a location spaced circumferentially from the slot 66. The slot 68 is an arcuate slot extending in the circumferential direction between two terminal ends, while having a width in the axial direction corresponding approximately to the width of the shaft 32. In this instance, the shaft mounted in the radial bore is arranged to be received through the slot 68 as the shaft and rotatable body are rotated together about the central axis of the rotatable body relative to the mounting body. The opposing terminal ends of the slot 68 define the range of movement and range of angular orientations of the shaft 32 relative to the mounting body.

Once the rotating body has been received within the barrel portion and the shaft 32 is received within the radial bore 68 of the rotating body, the shaft is retained in the body by retaining screws 70 threaded into axially opposed ends of the rotating body and into the inner end of the shaft 32.

To enclose the open ends of the barrel portion, a cap member 72 in the form of a circular plate-like member with a diameter matching the open end of the barrel portion is mounted onto each of the opposing ends of the rotatable body in fixed relation therewith. The retaining screws 70 are threaded through central apertures in respective ones of the caps such that the heads of the retaining screws clamp the caps onto the opposing ends of the rotating body. The caps 72 enclose the open ends of the grooves defining the teeth 64 in the rotatable body in addition to enclosing open ends of the barrel portion. The retaining screws 70 extending through corresponding apertures in the opposing ends of the rotating body and into the inner end of the shaft 32 function as a transverse retaining pin preventing sliding removal of the shaft in the radial direction.

The shaft 32 includes a stepped outer diameter so as to define a first inner portion 74 and a second outer portion 76. The first portion of the shaft has a first outer diameter which closely fits within the inner diameter of the bore 66. The second portion of the shaft projecting outward beyond the outer surface of the wall of the barrel portion of the mounting body is reduced in diameter to a second diameter less than the first diameter to define a shoulder 78 between the first and second portions of the shaft. The annular bearings of the caster assembly are arranged to be slidably received onto the second portion of the shaft for abutment against the shoulder 78. The outer end of the second portion 76 is externally threaded to permit a nut to be secured thereon such that an inner race of the annular bearings are clamped between the shoulder 78 and the nut while the sleeve portion of the caster assembly is secured to an outer race of the annular bearings for rotation relative to the shaft.

The slot 68 receiving the shaft 32 therethrough allows for angular orientation of the shaft relative to the mounting body to be varied through a range of 25 to 30 degrees in the illustrated embodiment, however larger or smaller ranges are readily permissible simply by extending the length of the slot in the circumferential direction and by extending the length of the toothed portion in the circumferential direction which defines the selected angular orientation of the shaft as described in further detail below.

The location of the slot can also be varied and is typically selected to compliment the bend in the intermediate portion of the connecting strut such that when the shaft 32 is centered within the slot 68 within a typical mounting configuration of the connecting strut to the front frame member of a wheelchair frame, the shaft is oriented in a substantially vertical orientation. In this instance minor variations to the configuration of the wheelchair relative to the typical configuration permit the angular orientation of the shaft to be adjusted in either direction from the central position resulting in a final configuration which maintains the caster axis in a vertical orientation.

In all instances the bearing support member defined by the shaft 32 is coupled to the rotating body so as to be pivotal together therewith about the central axis of the rotating body relative to the mounting body between a plurality of different angular positions of the rotating body which correspond to different angular orientations of the caster axis defined by the shaft 32.

The mounting body 46 further includes a channel 80 integrally formed in the intermediate portion such that the channel is elongate in a channel direction which is oriented substantially tangentially to the central axis of the barrel portion. The channel 80 extends across the slot 56 in the mounting body so as to extend through both of the two circumferentially opposing ends of the C-shaped barrel portion. More particularly, the channel extends substantially through the intermediate portion of the mounting body between an open end 82 located at an exterior of the mounting body adjacent one of the two opposed ends 58 at a bottom side of the mounting body and an opposing closed end 84 at a top side of a mounting body adjacent the other one of the two circumferentially opposed ends 58 of the C-shaped barrel portion 52.

A locking member 86 in a form of an elongate body is mounted within the channel 80 for linear sliding movement along a linear sliding axis oriented in the channel direction tangentially to the central axis of the barrel portion. The body of the locking member and the inner surface of the channel 80 have a mating cross section perpendicular to the sliding axis such that the channel provides support to the locking member as it is slidably displaced between a plurality of different locking positions relative to the mounting body.

An inner side of the elongate body closest to the rotating body defines a mating portion 88 therealong in the form of a plurality of linearly spaced teeth 90 arranged for meshing engagement with the teeth on the rotating body 54. The channel 80 locates the locking member in proximity to the rotating body such that the teeth remain in meshing engagement with one another throughout the linear sliding movement of the locking member. Accordingly, the rotatable body 54 is rotated relative to the mounting body between the different angular positions thereof together with movement of the locking member as the locking member is slidably displaced relative to the mounting body between the different locking positions thereof.

A clamping assembly is provided for engaging between the locking member 86 and the mounting body 46 to provide a dual function of: i) locking or fixing the locking member at any selected one of the plurality of locking positions relative to the mounting body; and ii) applying a clamping force between the two circumferentially opposing ends 58 of the C-shaped barrel portion which in turn provides a circumferential clamping force about the rotatable body received within the barrel portion.

The clamping assembly generally comprises two positioning screws 92 threaded into axially opposed ends of the locking member 86. One of the screws 92 is received through a corresponding aperture at the closed end 84 of the channel. At the opposing open end, a cap member 94 fully spans the open end after the locking member is inserted therein to overlap an external surface of the mounting body about a full periphery of the open end of the channel. An aperture in the cap receives the second one of the positioning screws 92 therethrough for threading into the axially opposed ends of the locking member.

The cap member 94 further includes a protruding portion 95 which projects inwardly into the mounting body between the locking member 86 and the rotatable body 54. The protruding portion defines a portion of the perimeter of the channel 80 which surrounds the locking member adjacent the open end 82 of the channel. The protruding portion 95 provides additional support about the end of the locking member to assist in limiting the movement of the locking member relative to the mounting body to only a sliding movement in the longitudinal direction of the channel.

In this instance, each of the positioning screws 92 includes a first portion 96 defining a head of the screw which is clamped onto a respective one of two opposing external sides of the mounting body in proximity to the two circumferentially opposed ends 58 of the C-shaped barrel portion respectively. Each positioning screw 92 also includes a second portion 98 in the form of a shaft extending in the sliding direction of the locking member and which is externally threaded for threaded connection into a respective one of two opposing ends of a common threaded bore 100 extending in the sliding direction fully through the locking member.

To initially assemble the caster mounting assembly 10, the rotatable body is first inserted into the barrel portion of the mounting body and then the locking member is inserted into the integral channel 80 in the mounting body with the teeth of the locking member being aligned and meshed with the teeth of the corresponding toothed portion of the rotatable body. The caster shaft 32 is then inserted into the radial bore through the corresponding slot in the barrel portion for being retained therein by the retaining screws 70 securing the end caps 72 onto opposing ends of the rotatable body. The shaft 32 is initially oriented at a first selected angular orientation relative to the mounting body and the two positioning screws are then screwed into opposing ends of the locking member 86 until the first portions abut the opposing external surfaces of the mounting body respectively.

Further tightening the positioning screws by further threading the screws into the opposing ends of the locking member from the initially abutted position functions as the clamping assembly to clamp the two circumferentially opposing ends 58 of the C-shaped barrel portion towards one another which provides circumferential clamping about the rotatable body at the selected angular orientation of the shaft. Furthermore, the tightening of the positioning screws locks the locking member at a selected locked position corresponding to a selected linear position of the locking member throughout a range of linear positions within the channel. The meshing engagement between the locking member and the rotatable body ensures that locking the position of the locking member in turn locks the angular orientation of the rotatable body and shaft 32 coupled thereto relative to the mounting body.

Where it is desirable to vary the angular orientation, one or both positioning screws can be loosened by rotating the positioning screws. This permits the locking member to be linearly adjusted between the different locked positions thereof which in turn causes rotation of the rotatable body between different angular positions thereof. Once a new selected orientation is achieved, the positioning screws are again tightened to lock the assembly at the new selected position.

The configuration of the positioning screws provide an infinite amount of positions within the linear range of the locking member which in turn provides an infinite number of angular positions of the rotatable body relative to the mounting body. Adjustment of the angular orientation is also accomplished with a high degree of control as the adjustment of the positioning screws permit a very fine adjustment of the linear position of the locking member and the resulting angular position of the shaft 32.

Figure 7:
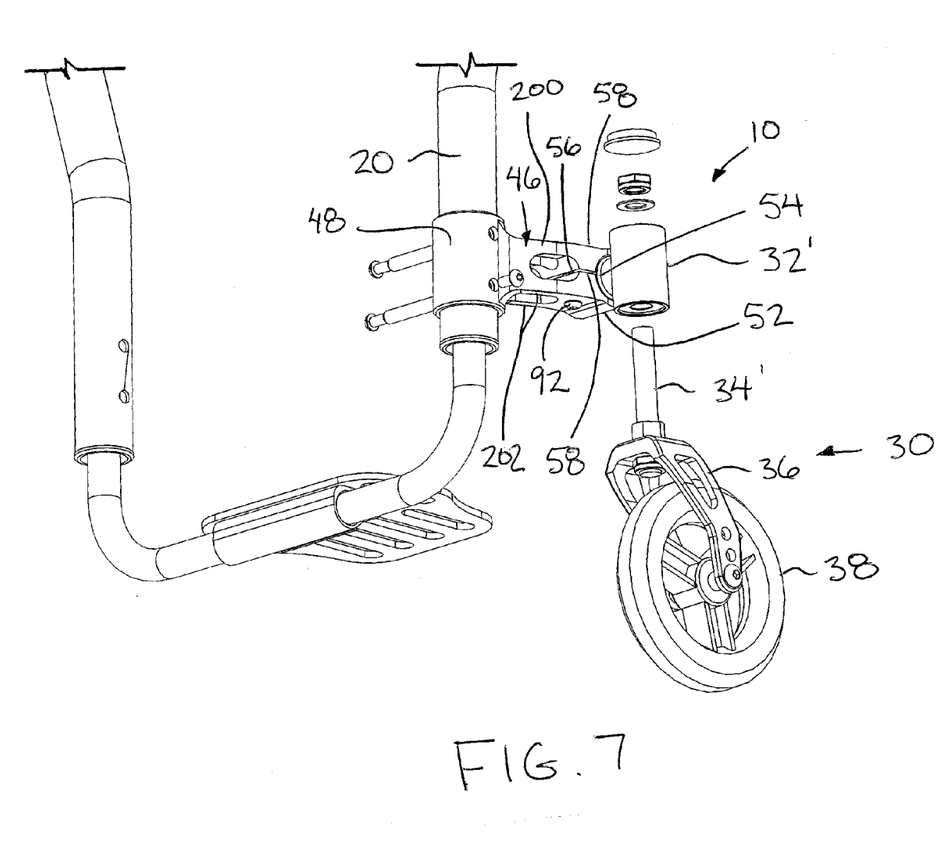
FIG. 7 is an exploded perspective view of a second embodiment of the caster mounting assembly.
Figure 8:
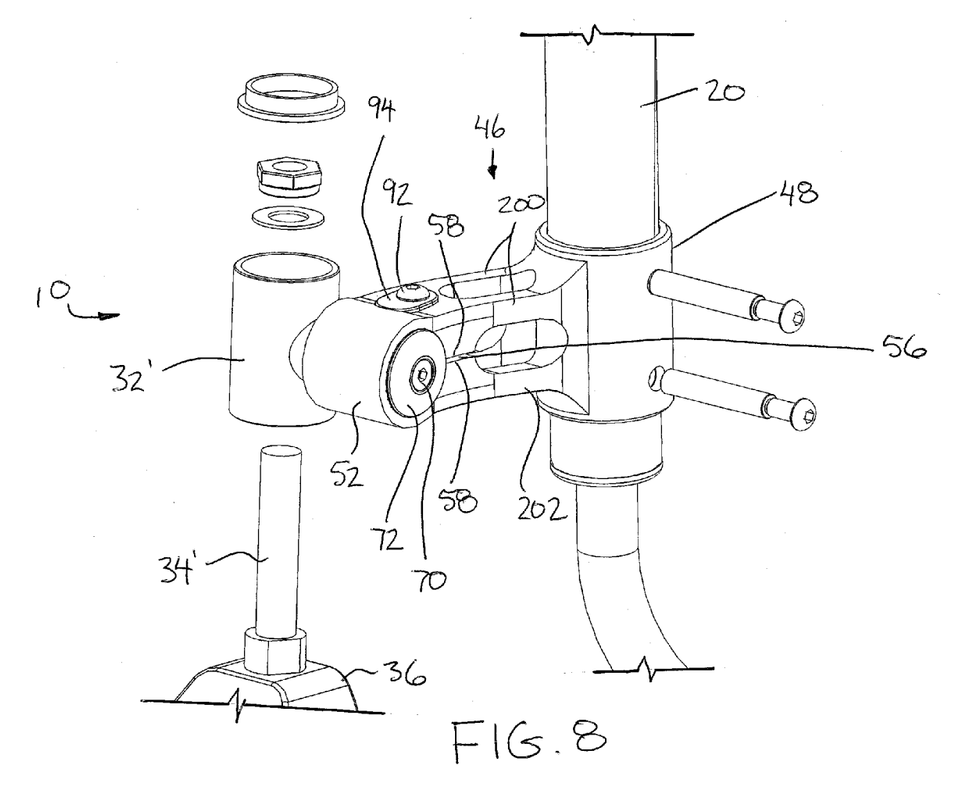
FIG. 8 is an alternative exploded perspective view of the caster mounting assembly according to FIG. 7.

As shown in the embodiment of FIGS. 7 and 8, the caster wheel assembly 30 may instead be of the type having forks 36 supporting a caster wheel 38 for rotation about a horizontal rolling axis relative to an auxiliary shaft 34' receiving annular bearings clamped thereon. In this instance the bearing support member of the caster mounting assembly 10 comprises a sleeve portion 32' receiving the annular bearings therein, instead of the shaft 32 described above. In this instance, the sleeve 32' defining the bearing support member is pivotal between different angular positions together with the rotatable body relative to the mounting body similar to the shaft 32 described above, while the annular bearings received within the sleeve support the remainder of the caster wheel assembly 30 for rotation together relative to the sleeve portion 32'. The sleeve portion 32 is fixed onto one end of the rotatable body which protrudes laterally outwardly from a corresponding open end of the Also as shown in the embodiment of FIGS. 7 and 8, the mounting portion 48 of the mounting body 46 in this instance comprises a mounting sleeve arranged to receive a portion of the respective front frame member of the wheelchair frame therethrough. Fasteners extend through cooperating apertures in the mounting sleeve and the front frame member respectively to fix the mounting body 46 relative to the wheelchair frame.

According to the embodiment of FIGS. 7 and 8, the circumferentially opposing ends 58 of the C-shaped inner cylindrical surface portion are again separated by the slot 56 to provide circumferential clamping about the rotatable body 54 received within the barrel portion. The intermediate portion of the mounting body between the mounting portion 48 and the barrel portion 52 in this instance comprises a pair of upper arms 200 connecting horizontally between the mounting sleeve 48 and one of the circumferentially opposed ends 58 and a pair of lower arms 202 connecting horizontally between the mounting sleeve 48 and the other one of the circumferentially opposed ends 58. The upper arms 200 are spaced above the lower arms 202 to define a gap therebetween. The slot 56 in this instance communicates from the inner cylindrical surface of the barrel portion to the gap between the upper and lower arms.

The channel 80 in FIGS. 7 and 8 is also formed integrally in the intermediate portion of the mounting body for locating the locking member 86 substantially in the same form as the embodiment of the first embodiment such that the mating portion 88 of the locking member meshes with the toothed portion of the rotatable body. The position of the locking member 86 is similarly controlled by use of two axially opposed positioning screws 92, which again provide the dual function of locking the position of the locking member and clamping about the rotatable body 54.

In yet further embodiments, the locking member may take other forms supported for movement on the mounting body other than a linear sliding movement. In one example, the locking member itself may comprise a positioning screw rotatably supported on the mounting body and having threads thereon which are arranged for direct meshing engagement with the teeth of the rotatable body. In this instance, rotating the positioning screw defining the locking member provides the function of a lead screw which in turn causes angular adjustment of the rotatable body relative to the mounting body.

The positioning screw described in the embodiments above may be any lead screw supported on the mounting body for rotation about a longitudinal axis of the screw between the plurality of locking positions. When providing a positioning screw or lead screw, generally in all instances the lead screw is operatively connected to the rotatable body 54 by a control assembly such that an input rotation to the lead screw between the different locking positions results in a corresponding displacement of the rotatable body and bearing support member fixed thereon between the different angular orientations. The control assembly may take the form of the locking member 80 described above which is longitudinally positioned by the lead screw and meshes with the rotatable body to rotate the body between the different angular positions. Alternatively the control assembly may involve a direct threaded connection between the lead screw and the toothed portion of the rotatable body. In yet a further embodiment the control assembly may take the form of a link arm which is pivotally coupled between the rotatable body and a sliding member on the mounting body in which the longitudinal position of the sliding member relative to the mounting body is controlled by threaded connection with the positioning screw.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A caster mounting assembly for mounting a caster wheel on a frame, the assembly comprising:
    a mounting body including a mounting portion arranged to be fixed onto the frame and a barrel portion defining a generally cylindrical inner surface portion;
    a rotatable body having a generally cylindrical outer surface portion received within the generally cylindrical inner surface portion of the barrel portion so as to be supported for rotation relative to the mounting body about a central axis of the rotatable body and a toothed portion including teeth which are spaced apart from one another in a circumferential direction relative to the central axis of the rotatable body;
    a bearing support member arranged to support the caster wheel thereon for steering movement about a caster axis defined by the bearing support member, the bearing support member being coupled to the rotatable body for rotation therewith relative to the mounting body about the central axis of the rotatable body between a plurality of angular positions corresponding to different angular orientations of the caster axis relative to the mounting body; and
    a locking member supported on the mounting body so as to be movable between a plurality of locking positions;
    the locking member including a mating portion formed thereon which is interlocked with the teeth on the rotatable body such that the rotatable body is pivotal between the different angular positions together with movement of the locking member between the plurality of locking positions; and
    the locking member being arranged to be fixed relative to the mounting body at any one of the plurality of locking positions.

2. The assembly according to claim 1 wherein the generally cylindrical outer surface portion of the rotatable body and the generally cylindrical inner surface portion of the mounting body each extend in the circumferential direction more than 180 degrees.

3. The assembly according to claim 1 wherein the toothed portion extends in the circumferential direction through a range less than 180 degrees.

4. The assembly according to claim 1 wherein the teeth have an outer radius relative to the central axis which is substantially identical to the generally cylindrical outer surface portion.

5. The assembly according to claim 1 wherein the teeth have a straight cut profile arranged for meshing with a corresponding profile formed on the mating portion of the locking member.

6. The assembly according to claim 1 wherein the barrel portion of the mounting body is slotted such that the generally cylindrical inner surface portion is generally C-shaped between two opposing ends which are spaced apart from one another and wherein there is provided a clamping assembly arranged to be connected between the opposing ends such that the mounting body is arranged to provide circumferential clamping about the rotatable body received therein.

7. The assembly according to claim 6 wherein the clamping assembly includes a clamping screw arranged to commonly fix the locking member relative to the housing at a selected one of the locking positions and provide circumferential clamping about the rotatable body when tightened.

8. The assembly according to claim 1 wherein the locking member is supported on the mounting body for linear sliding movement along a sliding axis between the plurality of locking positions and wherein the mating portion comprises teeth which are linearly spaced apart so as to be arranged for meshing engagement with the teeth of the rotatable body.

9. The assembly according to claim 8 wherein the mounting body includes a channel formed integrally therein having a cross section which mates with a cross section of the locking member so as to support the locking member for linear sliding movement therein.

10. The assembly according to claim 8 further comprising at least one positioning screw including a first portion engaging the mounting body and a second portion in threaded connection with the locking member having a longitudinal axis extending in a direction of the sliding axis such that rotation of said at least one positioning screw about the longitudinal axis positions the locking member along the sliding axis relative to the mounting body.

11. The assembly according to claim 10 wherein said at least one positioning screw comprises a pair of axially opposed positioning screws having first portions arranged to be clamped against opposing sides of the mounting body and second portions in threaded connection with opposing ends of the locking member.

12. The assembly according to claim 11 wherein the barrel portion of the mounting body is slotted such that the generally cylindrical inner surface portion is generally C-shaped between two opposing ends which are spaced apart from one another and wherein the first portions of the positioning screws are arranged to be clamped in proximity to respective ones of the opposing ends of the inner surface portion such that the positioning screws are arranged to provide circumferential clamping about the rotatable body received therein in addition to positioning the locking member relative to the mounting body at one of the plurality of locking positions.

13. The assembly according to claim 1 wherein the mounting portion of the mounting body comprises a lug arranged to be matingly received within an open end of a tubular frame member of a wheelchair.

14. The assembly according to claim 1 in combination with a caster wheel assembly wherein the bearing support member comprises a shaft and wherein the caster wheel assembly comprises:
    annular bearing members supported on the shaft;
    a sleeve portion supported about the annular bearing members so as to be supported for rotation relative to the shaft; and
    a caster wheel supported on the sleeve portion for rotation about a horizontal rolling axis such that the caster wheel and horizontal rolling axis thereof are rotatable with the sleeve portion relative to the shaft.

15. The assembly according to claim 1 in combination with a caster wheel assembly wherein the bearing support member comprising a sleeve portion and wherein the caster wheel assembly comprises:
    annular bearing members supported within the sleeve portion;

a shaft extending through the annular bearing members so as to be supported for rotation relative to the sleeve portion; and a caster wheel supported on the shaft for rotation about a horizontal rolling axis such that the caster wheel and horizontal rolling axis thereof are rotatable with the shaft relative to the sleeve portion.

16. The assembly according to claim 1 wherein the locking member comprises a positioning screw rotatably supported on the mounting body and wherein the mating portion comprises threads on the positioning screw in meshing engagement with the teeth on the rotatable body.

17. The assembly according to claim 1 for being supported on a forward frame member of a wheelchair frame wherein the assembly further comprises a connecting strut extending between a first end arranged to be coupled to the forward frame member of the wheelchair frame and a second end opposite the first end supporting the mounting body thereon.

18. A caster mounting assembly for mounting a caster wheel on a frame, the assembly comprising:
a mounting body including a mounting portion arranged to be fixed onto the frame;
a rotatable body supported on the mounting body for rotation relative to the mounting body;
a bearing support member arranged to support the caster wheel thereon for steering movement about a caster axis defined by the bearing support member, the bearing support member being coupled to the rotatable body for rotation therewith relative to the mounting body about the central axis of the rotatable body between a plurality of angular positions corresponding to different angular orientations of the caster axis relative to the mounting body;
a positioning screw arranged to be supported on the mounting body for rotation about a longitudinal axis of the positioning screw relative to the mounting body between a plurality of locking positions; and
a control assembly operatively connected between the positioning screw and the rotatable body such that the bearing support member is movable between the plurality of angular positions responsive to rotation of the positioning screw about the longitudinal axis between the plurality of locking positions.

19. The assembly according to claim 18 wherein the positioning screw is arranged to be fixed relative to the mounting body at any one of the plurality of locking positions whereby the bearing support member is retained at a corresponding angular position.

20. A wheelchair comprising:
a frame including a seat portion comprising two side frame members extending in a forward direction from a rear end to a front end, a forward leg portion comprising two forward frame members extending downwardly and forwardly from the front end of respective ones of the side frame members, and an upper portion extending upwardly from a rear end of the side frame members;
two rear wheel assemblies supporting the rear end of the seat portion on a pair of rear wheels; and
two front caster wheel assemblies supported on the two forward frame member respectively, each caster wheel assembly comprising:
a connecting strut extending between a first end coupled to the respective forward frame member and a second end opposite the first end;
a mounting body including a mounting portion fixed onto the second end of the connecting strut and a barrel portion defining a generally cylindrical inner surface portion;
a rotatable body having a generally cylindrical outer surface portion received within the generally cylindrical inner surface portion of the barrel portion so as to be supported for rotation relative to the mounting body about a central axis of the rotatable body and a toothed portion including teeth which are spaced apart from one another in a circumferential direction relative to the central axis of the rotatable body;
a front caster wheel;
a bearing support member supporting the caster wheel thereon for steering movement about a caster axis defined by the bearing support member, the bearing support member being coupled to the rotatable body for rotation therewith relative to the mounting body about the central axis of the rotatable body between a plurality of angular positions corresponding to different angular orientations of the caster axis relative to the mounting body; and
a locking member supported on the mounting body so as to be movable between a plurality of locking positions;
the locking member including a mating portion formed thereon which is interlocked with the teeth on the rotatable body such that the rotatable body is pivotal between the different angular positions together with movement of the locking member between the plurality of locking positions; and
the locking member being arranged to be fixed relative to the mounting body at any one of the plurality of locking positions.

\* \* \* \* \*